Patented Jan. 18, 1927.

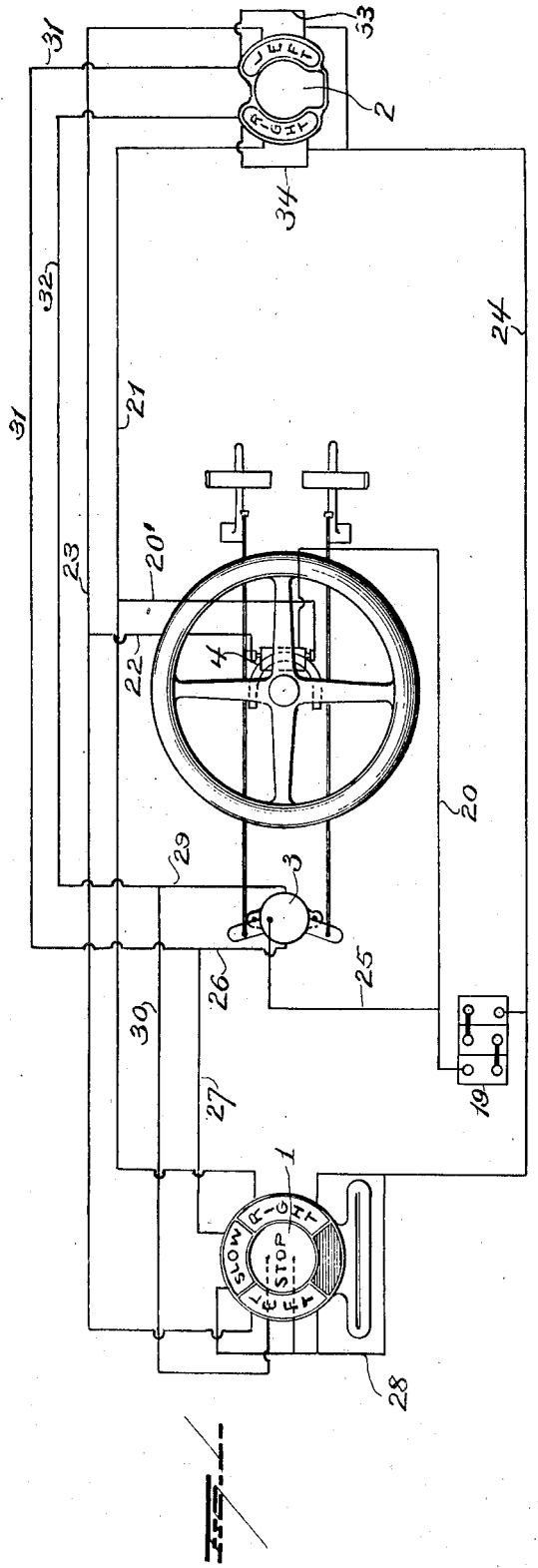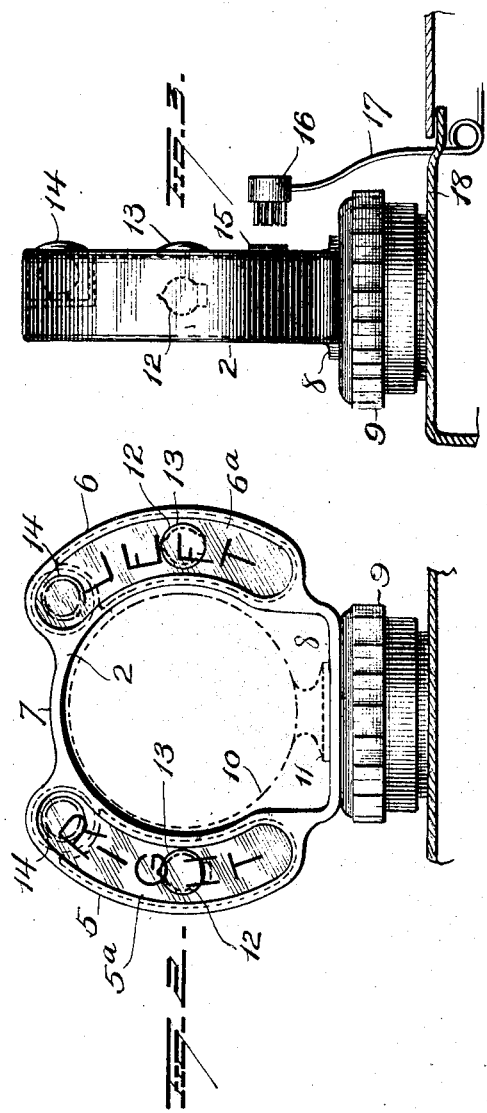

1,614,509

UNITED STATES PATENT OFFICE.

CLIFFORD PROVOST WICKS, OF STAMFORD, CONNECTICUT.

SIGNALING MEANS FOR AUTOMOBILES.

Application filed April 4, 1922. Serial No. 549,612.

This invention relates to improved signaling means for automobiles, one object being to provide an improved front signal under the control of the driver to indicate the direction in which he may desire to turn and which shall also be operable to indicate the operative condition of the lamps in said signal.

A further object is to provide means whereby the front signal shall be operable also to indicate to the driver whether "Slow" or "Stop" rear signals have been properly lighted.

A further object is to so construct a front signal for an automobile that it may be mounted upon and carried by the radiator cap and to so connect the lamps of said signal in electrical circuits, that the cap and signal may be easily removed and replaced when necessary.

With these and other objects in view, the invention consists in certain novel features of construction and combinations of parts as hereinafter set forth and pointed out in the claims.

In the accompanying drawings: Figure 1 is a diagrammatical view showing a signaling system for an automobile, embodying my improved front signal and illustrating its relation to a rear signal and controlling switches; Figure 2 is a face view showing the front signal and radiator cap to which it is applied, and Figure 3 is a side view showing the front signal.

In the diagrammatical view, I have shown a rear signal 1 to display direction and speed signals "Right," "Left," "Slow," and "Stop," each to be illuminated by suitable electric lamps; a front signal 2 having "Right" and "Left" direction indications; a switch 3 for controlling the lamps of the "speed" signals, and a switch 4 for controlling the lamps of the direction signals.

The front signal 2 comprises a frame including two diametrically opposite casings 5, 6 which are preferably curved and connected at their upper ends by a web 7 and at their lower ends by a flat connecting member 8 to seat upon a radiator cap 9 and be secured thereto in any suitable manner. In Figure 2 of the drawing, I have represented in dotted lines a well-known temperature indicator 10 mounted on the radiator cap and encircled by the signal frame, and the latter may be held in place on the cap 9 by the base flange 11 of said indicator. Thus it will be seen that my improved front signal frame is adaptable for attachment to the radiator cap without interference with the indicator, but where the latter is not employed, the signal frame will permit of the employment of any desired emblem or decorative device on the radiator cap.

The casings 5 and 6 of the front signal are provided with front glass panels 5ᵃ and 6ᵃ on which are indicated the words "Right" and "Left" respectively, and within said casings, incandescent electric lamps 12 are located. The panels 5ᵃ and 6ᵃ may be made of green and red glass respectively to indicate the respective sides of the vehicle. The rear walls of the casings 5 and 6 may be provided with small round lenses 13 behind which are lamps in circuit with "Right" and "Left" signals respectively to denote to the operator of the vehicle whether the proper signal lamp within either of said casings is lighted.

The casings of the signal frame are also provided in their rear faces with other small lenses 14 (different and distinctive colors respectively) and the lamps behind these lenses are included in circuit with the lamps of the "Slow" and "Stop" signals of the rear signal 1, so that the operator may be informed of the correct operation of these rear signal lamps. It will be understood, of course, that partitions are disposed within the respective casings to separate the lamps 13 and 14 so that the lamps are located in independent chambers.

The various lamp terminals in the front signal device are connected with suitable contacts in a socket piece 15 and with these, the terminals of a plug 16, are cooperable to include said lamps in the proper circuits,— the circuit terminals being included in a cable 17 passing through a hole in the radiator hood 18, and the plug 16 being carried by this cable. By the provision of the plug 16 to effect the proper circuit connections with the lamps of the front signal, it is evident that by simply withdrawing said plug, the radiator cap carrying said front signal may be readily removed, and when it shall have been replaced, the circuit connections may be quickly effected by inserting the plug 16.

For the purpose of controlling the front and rear "direction" signals, the "direction" switch 4 is provided on the steering head. A battery is shown at 19 and this is connected by a conductor 20 with a terminal of the switch 4. Another terminal of this switch is connected by a conductor 20¹ with a conductor 21, and another terminal of said switch is connected by a conductor 22 with a conductor 23. The conductor 21 is connected with one terminal of each lamp of the front and rear signals indicating "Right" and the conductor 23 is connected with one terminal of the lamp of each (front and rear) signal indicating "Left",—the other terminals of all the lamps of the direction signals being connected with a return conductor 24.

The lamps of the speed signals ("Slow" and "Stop") are controlled by the switch mechanism 3 under the control of the operator. A conductor 25 connects the conductor 20 with the "speed" switch 3, and one terminal of the latter is connected by conductor 26—27 with one terminal of the lamp of the rear "Slow" signal and the other terminal of this lamp is connected by a conductor 28 with the return conductor 24. A conductor 29—30 connects the other terminal of the speed switch with one terminal of the lamp of the rear "Stop" signal and the other terminal of this lamp is connected through the conductor 28 with the return conductor 24.

In order that the lamp behind one or the other of the rear colored lenses 14 of the front signal shall be lighted when the "speed" switch is operated to light one or the other rear speed signal lamp, one terminal of the lamp behind one of the lenses 14 of the front signal is connected by a conductor 31 with the conductor 26 and one terminal of the lamp behind the other lens 14 is connected by a conductor 32 with the conductor 29,—the other terminals of said lamps being connected by conductors 33—34 with the conductor 24. The switches 3 and 4 may be of any approved detail construction, and have been illustrated in a conventional manner only. The switch 3 is indicated as consisting of two switch arms, independently controlled by levers near the vehicle steering wheel, both connected to the conductor 25 and one arranged to close a circuit through the conductor 26 while the other is arranged to close a circuit through the conductor 29. The switch 4 is indicated as a pair of push buttons, one arranged to connect the conductor 20 with the conductor 20¹ and the other to connect the conductor 20 with the conductor 22.

With my improvements the front signal is located at the most logical position; it serves to inform traffic officers or occupants of approaching vehicles of any intended turn; it is operable to inform the operator of the vehicle whether he has given the proper signal in the said front signal and also in the rear signals and if the rear speed signals are in normal operative condition, the proper rear signal will be lighted simultaneously with the lighting of a corresponding signal in the front signal.

I have described and shown my improved front signal supported on the radiator cap, but it is to be understood that it may be otherwise supported at the front central portion of the radiator.

Slight changes might be made in the details of my invention without departing from the spirit thereof or limiting its scope and hence I do not restrict myself to the precise detail herein set forth.

Having fully described my invention what I claim as new and desire to secure by Letters-Patent, is:—

1. In signaling means for automobiles, a front direction signal comprising a frame adapted for attachment to a radiator cap and to surround a motormeter on said cap and having casings upon its outer sides to contain illuminating means, said casings having front panels to indicate direction when illuminated.

2. In signaling means for automobiles, a front direction signal comprising a frame adapted for connection with a radiator cap and including in a single structure two vertically extending arcuate casings to contain illuminating means, and connections between corresponding ends of the casings, each of said casings having a front panel of material which will permit passage of light rays, one of said panels designated "Right" and the other panel designated "Left".

3. A front direction signal for an automobile, comprising two casings to contain illuminating means, each casing having a front panel of material through which light rays may pass, a web connecting the upper ends of said casings and a base portion connecting the lower ends of said casings and adapted to be secured at the front central portion of the radiator of the automobile.

4. A front direction signal for an automobile, comprising two casings to contain illuminating means, each casing having a front panel of material through which light rays may pass, a web connecting the upper ends of said casings, and a flat base portion connecting the lower ends of said casings and adapted to rest upon and to be secured to a radiator cap.

In testimony whereof, I have signed this specification.

CLIFFORD PROVOST WICKS.